(12) United States Patent
Sartisohn (10) Patent No.: US 9,730,519 B2
(45) Date of Patent: Aug. 15, 2017

(54) LIFT ADJUSTER AND SEATING AND/OR RECLINING FURNITURE WITH A LIFT ADJUSTER

(71) Applicant: Ferdinand Lusch GmbH & Co. KG, Bielefeld (DE)

(72) Inventor: Erich Sartisohn, Bielefeld (DE)

(73) Assignee: Ferdinand Lusch GmbH & Co. KG, Bielefeld (DE)

( * ) Notice: Subject to any disclaimer, the term of this patent is extended or adjusted under 35 U.S.C. 154(b) by 0 days.

(21) Appl. No.: 15/037,486

(22) PCT Filed: Oct. 27, 2014

(86) PCT No.: PCT/EP2014/073015
§ 371 (c)(1),
(2) Date: May 18, 2016

(87) PCT Pub. No.: WO2015/071080
PCT Pub. Date: May 21, 2015

(65) Prior Publication Data
US 2016/0286959 A1    Oct. 6, 2016

(30) Foreign Application Priority Data
Nov. 18, 2013   (DE) .................. 10 2013 019 172

(51) Int. Cl.
*A47C 1/037*   (2006.01)
*A47C 3/28*    (2006.01)
(Continued)

(52) U.S. Cl.
CPC ............ *A47C 1/037* (2013.01); *A47C 1/02* (2013.01); *A47C 1/034* (2013.01); *A47C 1/036* (2013.01); *A47C 3/285* (2013.01); *F16B 7/1409* (2013.01)

(58) Field of Classification Search
None
See application file for complete search history.

(56) References Cited

U.S. PATENT DOCUMENTS 3,737,136 A * 6/1973 Snurr ............... A47B 9/083
                                                 108/147.19
3,951,238 A * 4/1976 Dent ................ F16B 7/1409
                                                 16/82
(Continued)

FOREIGN PATENT DOCUMENTS

CN      2903526 Y     5/2007
CN      2924124 Y     7/2007
(Continued)

*Primary Examiner* — David E Allred
(74) *Attorney, Agent, or Firm* — The Webb Law Firm (57) ABSTRACT

A lift adjuster is depicted and described for adjusting seating furniture and/or reclining furniture, with a housing and an adjustment bracket. The adjustment bracket is maintained in the housing and can be partially pulled out of the housing. In order to enable comfortable adjustment, it is proposed that at least one clamping element is provided displaceable with respect to the adjustment bracket between a clamping position and at least one adjustment position in that the at least one clamping element is received in a clamping manner in the clamping position in a clamping gap between the adjustment bracket and the housing such that the adjustment bracket is prevented from sliding into the housing.

18 Claims, 7 Drawing Sheets

(51) Int. Cl.
*A47C 1/02* (2006.01)
*A47C 1/034* (2006.01)
*A47C 1/036* (2006.01)
*F16B 7/14* (2006.01)

(56) References Cited

U.S. PATENT DOCUMENTS

| | | | | |
|---|---|---|---|---|
| 3,991,964 A * | 11/1976 | Christopher | ............ | E04G 25/06 248/354.1 |
| 4,526,334 A * | 7/1985 | Rantakari | ............ | A47B 9/083 248/157 |
| 4,601,246 A * | 7/1986 | Damico | ............ | A47B 9/083 108/146 |
| 4,693,442 A * | 9/1987 | Sills | ............ | A47C 3/20 248/157 |
| 5,078,349 A * | 1/1992 | Smith | ............ | A61M 5/1415 248/125.8 |
| 6,609,686 B2 * | 8/2003 | Malizia | ............ | F16B 7/1409 248/125.8 |
| 7,845,602 B1 * | 12/2010 | Young | ............ | F16B 7/1409 248/125.8 |
| 8,146,876 B1 * | 4/2012 | Young | ............ | F16B 7/1409 248/161 |
| 8,256,732 B1 * | 9/2012 | Young | ............ | F16B 7/1409 248/161 |
| 8,262,036 B2 * | 9/2012 | Graham | ............ | A61G 7/0503 248/125.8 |
| 8,469,326 B1 * | 6/2013 | Young | ............ | F16B 7/1409 248/161 |
| 8,714,508 B1 * | 5/2014 | Young | ............ | F16B 7/1409 248/161 |
| 8,820,693 B1 * | 9/2014 | Young | ............ | F16B 7/1409 248/161 |
| 9,010,710 B1 * | 4/2015 | Young | ............ | F16B 7/1409 248/161 |
| 9,045,981 B2 * | 6/2015 | Baas | ............ | E04G 25/08 |
| 2002/0024247 A1 | 2/2002 | Mori | | |

FOREIGN PATENT DOCUMENTS

| | | |
|---|---|---|
| DE | 202008013317 U1 | 1/2009 |
| EP | 1080665 A1 | 3/2001 |
| FR | 74932 E | 3/1961 |
| JP | 57156605 U1 | 3/1981 |
| JP | 6220207 U | 2/1987 |
| JP | 63251694 A | 10/1988 |

* cited by examiner

LIFT ADJUSTER AND SEATING AND/OR RECLINING FURNITURE WITH A LIFT ADJUSTER

CROSS-REFERENCE TO RELATED APPLICATIONS

This application is the United States national phase of International Application No. PCT/EP2014/073015 filed Oct. 27, 2014, and claims priority to German Patent Application No. 10 2013 019 172.6 filed Nov. 18, 2013, the disclosures of which are hereby incorporated in their entirety by reference.

BACKGROUND OF THE INVENTION

Field of the Invention

The invention relates to a lift adjuster for adjusting seating furniture and/or reclining furniture, with a housing and an adjustment bracket, wherein the adjustment bracket is maintained in the housing and can be partially pulled out of the housing. Furthermore, the invention relates to seating and/or reclining furniture with two components adjustable with respect to each other, preferably comprising a backrest, a head part, a foot part and/or an armrest, wherein the two components are connected via a lift adjuster.

Description of Related Art

In order to improve the comfort for the user, numerous pieces of seating and reclining furniture, such as armchairs, sofas, couches and beds can be adjusted by the user. The adjustability relates to, for example backrests, head parts, foot parts and/or armrests which can be adjusted for example in the inclination and/or height thereof. So-called lift adjusters have proven themselves to be able to provide corresponding adjustability. Lift adjusters comprise a housing and an adjustment bracket, which can be partially pulled out of the housing. The adjustment bracket bears a spring-loaded latching element, which latches successively into receiving cavities provided along the housing for this purpose as a result of the spring force when the adjustment bracket is pulled out. The receiving cavities and the latching element are, in this respect, matched to each other such that the adjustment bracket cannot be slid back into the housing again after latching in a position predetermined by the receiving cavity. This is prevented by the positive engagement of the latching element into the corresponding receiving cavity. Pulling out the adjustment bracket further from the same position can, however, be carried out without problems. In order to be able to bring the adjustment bracket back into the initial position, the adjustment bracket must initially be removed from the housing to an end position. In this respect, the latching element is blocked such that it cannot engage in the receiving cavities provided there when the adjustment bracket is slid back. When the adjustment bracket is pulled out of the housing again, the latching element is, however, reactivated and as a result it again latches successively into the receiving cavities provided along the housing.

The adjustment bracket of known lift adjusters is typically connected to the component to be adjusted, for example in the form of a backrest, head support, foot support or armrest, while the housing of the lift adjuster is fixed to a component, with respect to which the component to be adjusted should be adjusted. This can, in this respect in particular, be a supporting element of the furniture such as for example a frame of the furniture or a seating frame of the same. If the component to be adjusted is adjusted, i.e. for example pulled out or pivoted, the adjustment bracket is partially removed from the housing and remains in a position in which the latching element of the adjustment bracket positively engages into a receiving cavity of the housing. In this position, the component to be adjusted can be loaded by the user, without it leading to an accidental backwards adjustment. Further adjustment in the pull-out direction of the adjustment bracket is, in this respect however, possible, whereby the latching element engages into another receiving cavity. In order to move the component to be adjusted back into the initial position thereof, the component to be adjusted must initially be further adjusted until the adjustment bracket arrives in an end position. From this end position, the adjustment bracket can again be slid fully into the housing and by backwards adjustment of the adjustable component into the initial position thereof. Starting from this position, a readjustment, for example pivoting or pulling out the component to be adjusted is possible.

What is disadvantageous in the known lift adjusters is, however, that the adjustment bracket can only be locked in a few positions. The adjustment bracket also has to be pulled out quite far from the last locking position in order to block the latching element for the adjustment bracket sliding back. The adjustment bracket also has to be pulled out quite far from the maximum slid-in position until the latching element is active again and it can latch into the first receiving cavity. The corresponding adjustment paths between the end positions and the first or the last receiving cavity are also called release paths and should be short for easy operability.

Consequently, an object underlying the present invention is to design and refine the lift adjusters, seating and/or reclining furniture of the type mentioned in the introduction in each case such that more comfortable adjustment can take place.

This object is achieved with a lift adjuster according to the present invention in that at least one clamping element is provided displaceable with respect to the adjustment bracket between a clamping position and at least one adjustment position in that the at least one clamping element is received in a clamping manner in the clamping position in a clamping gap between the adjustment bracket and the housing such that the adjustment bracket is prevented from sliding into the housing.

SUMMARY OF THE INVENTION

The invention has therefore acknowledged that the step-wise latching of the adjustment bracket and the housing can advantageously be dispensed with in favour of a clamping connection. In order to, however, prevent accidental backwards sliding of the adjustment bracket into the housing when pulling the adjustment bracket out of the housing, the at least one clamping element is provided displaceable with respect to the adjustment bracket and namely from an adjustment position into a clamping position and back. In this way, the at least one clamping element can arrive in a clamping gap between the adjustment lever and the housing and namely such that the clamping element is arranged in a clamping manner in a clamping position between the adjustment bracket and the housing. This clamping engagement of the clamping element in the clamping gap prevents the backwards sliding of the adjustment bracket into the housing, for example by forming a positive engagement between the adjustment bracket and the clamping element.

The adjustment bracket can, however, be further pulled out from this clamping position, wherein the clamping element is displaced with respect to the adjustment bracket into the adjustment position. In this position, the clamping element does not impede the adjustment bracket being pulled out further.

The clamping element can essentially comprise different forms. The form of the clamping element should, in this respect, preferably be selected such that reliable clamping is achieved and high clamping forces can be transferred. The clamping element should, however, also be designed such that the clamping of the clamping element in the clamping gap can be easily suspended again if the adjustment bracket is pulled out further. Particularly preferred in this respect are spherical or cylindrical clamping elements. The clamping gap should also be adapted to the clamping element used in order to ensure easy clamping and to ensure the clamping is easily overcome when the adjustment bracket is pulled out further. In order that high clamping forces can be received, it is essentially recommended for the adjustment bracket, the housing and/or the clamping element to be manufactured from a metallic material.

Furthermore, it may essentially be sufficient to provide one clamping element. In order to improve the comfort when operating the lift adjuster and to increase, as required, the balance of the force transfer, a plurality of clamping elements can also be provided. The clamping elements can be provided in a common clamping gap and can be maintained in the clamping position in a clamping manner in the same. It is particularly preferred, however, when a plurality of clamping gaps are provided and at least one clamping element, in particular precisely one clamping element is provided in each clamping gap. In order to simultaneously keep the manufacturing input and the manufacturing costs low, it is particularly preferred for two clamping elements to be provided. Alternatively or additionally, it is preferred for the same reasons for two clamping gaps to be provided. These clamping gaps can preferably be formed between opposing surfaces of the adjustment lever and similarly opposing inner sides of the housing in order to ensure even force distribution.

Since the adjustment bracket accidentally sliding back into the housing is prevented with the lift adjuster according to the invention by the clamping of the at least one clamping element in the clamping gap, the lift adjuster can be operated with very little noise. Audible latching of a latching element of the adjustment bracket into a corresponding receiving cavity of the housing, as is the case in the prior art, no longer occurs. The comfort for the user is thereby further improved.

In the case of a first preferred embodiment of the lift adjuster, the at least one clamping gap tapers in the pull-out direction of the adjustment bracket. In this way, clamping can be achieved by displacing the clamping element in the clamping gap and the clamping can be suspended again by displacing the clamping element in the opposite direction. The at least one clamping element is, in this respect, preferably received in both positions in the clamping gap. Accidentally blocking the clamping element when introducing it into the clamping gap can thus be avoided. The clamping gap can be designed in a wedge-like manner for the sake of simplicity and can comprise flat surfaces which run at an acute angle to each other. Irrespective of this, it is recommended, from a constructive point of view, for a surface of the housing and a surface of the adjustment bracket to be formed by the two opposing surfaces of the clamping gap.

The provision of the at least one clamping gap is possible in a simple manner if the adjustment bracket comprises an end tapering at least to one side and being received in the housing. At least one clamping gap can thereby be provided.

If the end of the adjustment bracket tapers at a plurality of, preferably two opposing sides, a plurality of, preferably two clamping gaps can also be formed. The required clamping is then easily achieved when the at least one clamping element is clamped in the clamping position between at least one side of the tapering end of the adjustment bracket and an inner side of the housing.

In order to be able to guide the clamping elements more easily and precisely relative to the adjustment bracket and/or to the corresponding at least one clamping gap, it is recommended for a clamping slide holding the at least one clamping element to be provided. In this respect, the clamping slide is preferably provided displaceable with respect to the adjustment bracket and namely from a clamping position into an adjustment position and back in order to ensure the function of the clamping elements. From a constructive point of view, it is also preferred for the clamping slide to be maintained on the adjustment bracket itself, albeit displaceably, and received in the housing, if required. Essentially a plurality of clamping slides can also be provided, which comprise in each case at least one clamping element and they displaceably guide said clamping element with respect to the adjustment bracket. In order to limit the number of components required for the manufacture of the lift adjuster, it is, however, essentially preferred if only one clamping slide is provided. In this respect, the clamping element can be integrally designed with the clamping slide and can be formed by the latter as a result. A two-piece design is, however, preferred. Since the clamping slide has to receive smaller forces in comparison to the clamping element, the clamping slide is formed preferably substantially from plastic for reasons of cost.

In order to provide the at least one clamping element and/or the clamping slide displaceably in relation to the adjustment bracket and simultaneously provide an undetachable connection, the adjustment bracket can comprise an oblong hole, wherein the at least one clamping element and/or the clamping slide positively and displaceably engage into the oblong hole.

In order that the lift adjuster is always secured against accidentally telescoping, the at least one clamping element has to be maintained not merely displaceable with respect to the adjustment bracket. The at least one clamping element also has to be able to be moved with the adjustment bracket along the housing when the adjustment bracket is pulled out further by a greater increment of length. A positive engagement can thus preferably be formed between the at least one clamping element and/or the clamping slide in order to be able to pull out the at least one clamping element and/or the clamping slide with the adjustment bracket over a greater distance. Pulling out the adjustment bracket slightly without correspondingly also taking the at least one clamping element and/or the clamping slide is, however, preferably possible nevertheless in order to displace the at least one clamping element by suspending the clamping slightly with respect to the clamping gap.

In order to be able to slide the adjustment bracket back into the housing after successfully pulling it out of the housing, provision can be made for the at least one clamping element and/or the clamping slide to be fixed in a position on the adjustment bracket, in which the at least one clamping element is not in clamping engagement with the clamping gap. A separate releasable connection between the adjustment bracket and the at least one clamping element and/or the clamping slide can serve for this purpose. The adjustment bracket is then preferably slidable into the housing from an end position at least for example to an initial position in the state connected via the separate connection with the at least one clamping element and/or the clamping slide. The corresponding connection is designated as separate because the at least one clamping element and/or the clamping slide is still maintained displaceably on the adjustment bracket via another connection.

Since the separate connection should be a releasable connection, which is only closed when the adjustment bracket slides backwards for example from a pulled-out end position into a slid-in initial position, a clamping connection and/or latching connection are possible as a separate connection for the sake of simplicity.

In order that the separate connection between the adjustment bracket and the at least one clamping element and/or the clamping slide is forcibly closed in the end position when the adjustment bracket is pulled out, the housing can provide an end stop for the clamping element and/or the clamping slide. Displacing the at least one clamping element and/or the clamping slide further is thereby impeded, while the adjustment bracket is displaceable even further in the pull-out direction, if required. The relative movement, imposed thereby, between the at least one clamping element and/or the clamping slide, on the one hand, and the adjustment bracket, on the other hand, can be used to, forcibly and without further action from the user, close the separate connection. The at least one clamping element and/or the clamping slide is thus preferably fixed by the end stop in the pull-out direction of the adjustment bracket, while the adjustment bracket can be pulled out even slightly further. An end stop, provided if required, between the housing and the adjustment bracket is thus only active when the adjustment bracket has been pulled out even slightly further. The end stop between the housing and the adjustment bracket ensures that the adjustment bracket cannot be completely pulled out of the housing in order to avoid the housing and the adjustment bracket disengaging. The adjustment path of the adjustment bracket from reaching the end stop for the at least one clamping element and/or the clamping slide to the end stop of the adjustment bracket can be selected to be very short (release path), which makes the operation of the lift adjuster by the user comfortable.

In order that the separate connection between the adjustment bracket and the clamping element and/or the clamping slide can be forcibly released when the adjustment bracket is slid into the initial position, the housing can, alternatively or additionally, provide an initial stop for the clamping element and/or the clamping slide. If the adjustment bracket, after the at least one clamping element and/or the clamping slide rests on the initial stop, is slid even slightly further into the housing in the direction of the initial position towards a further end position, the relative movement, imposed thereby, between the at least one clamping element and/or the clamping slide, on the one hand, and the adjustment bracket, on the other hand, can be used to again release the separate connection between the at least one clamping element and/or the clamping slide and the adjustment bracket. The initial stop limits the movement of the at least one clamping element and/or the clamping slide into the housing, while the adjustment bracket can be slid into the housing even slightly further. Only after that is an initial stop provided between the adjustment bracket and the housing, if required, which limits the maximum extent the adjustment bracket is slid into the housing. The maximum extent of the sliding-in could also alternatively be limited by locking the at least one clamping element now maintained displaceably again with respect to the adjustment bracket in the at least one clamping gap towards an initial stop of the adjustment bracket. The adjustment path of the adjustment bracket from reaching the initial stop of the at least one clamping element and/or the clamping slide to the initial stop of the adjustment bracket can be selected to be very short (release path), which makes the operation of the lift adjuster by the user comfortable.

The separate connection between the adjustment bracket and the at least one clamping element and/or the clamping slide can be provided constructively simply and reliably when the adjustment bracket comprises at least one pin or the like. The at least one clamping element and/or the clamping slide can then, alternatively or additionally, comprise at least one connection element, which clamps and/or engages behind the pin or the comparable connection element in the case of a closed separate connection. The at least one pin of the adjustment bracket can then be received in a recess of the at least one clamping element and/or the clamping slide. At least one pin can of course also alternatively be provided on the at least one clamping element and/or the clamping slide, said pin can cooperate and thus be connected with at least one connection element of the adjustment bracket. The corresponding connection in each case preferably forms a force-type and/or positive engagement. A latching connection, in particular, is recommended at least in the case of a positive engagement.

Essentially the housing and the adjustment bracket can also comprise corresponding bearing surfaces independent of an end stop between the housing and the at least one clamping element and/or the clamping slide. These corresponding bearing surfaces can form an end stop in order to safely deflect pull-out forces to the housing in an end position of the adjustment bracket when the bearing surfaces rest on each other. The adjustment bracket being pulled out of the housing so far that the adjustment bracket disengages with the housing is thus also avoided.

In order to ensure, in a constructively simple manner, a relative displacement between the adjustment bracket, on the one hand, and the at least one clamping element and/or the clamping slide, on the other hand, between the clamping position and the adjustment position, the at least one clamping element and/or the clamping slide can rest at least in sections in a frictionally engaged manner on the housing. It can, thus, for example be achieved that the at least one clamping element and/or the clamping slide initially maintains a position relative to the housing when the adjustment bracket is pulled further out of the housing starting from a clamping position. The corresponding relative movement between the at least one clamping element and/or the clamping slide, on the one hand, and the adjustment bracket, on the other hand, causes the clamping element to no longer be maintained in a clamping manner in the clamping gap. A, for example positive connection between the adjustment bracket and the at least one clamping element and/or the clamping slide can then cause the at least one clamping element and/or the clamping slide to be displaced along the housing when the adjustment bracket is further adjusted with the latter. The adjustment bracket, in another position, can then be slid into the housing again only by a very small increment of length before the clamping element again arrives in a clamping position in the clamping gap and prevents the adjustment bracket sliding further into the housing. If required, the at least one clamping element and/or the clamping slide can be continuously resting on the housing while the adjustment bracket is adjusted. Then, while the at least one clamping element and/or the clamping slide is adjusted, the corresponding static friction is overcome and namely as a result of the positive connection between the adjustment bracket and the at least one clamping element and/or the clamping slide.

In a particularly preferred embodiment of the lift adjuster, provision is made for the adjustment bracket to be adjustable in regions, at least substantially continuously along the housing. The adjustment bracket can thus be secured against sliding into the housing over wide parts of the adjustment path by corresponding clamping forces in the housing. The clamping can, namely in contrast to the known lift adjusters, not only be provided in the region of certain receiving cavities, but also preferably in regions at each point of the housing.

BRIEF DESCRIPTION OF THE DRAWINGS

The invention is subsequently explained further by means of a drawing depicting only exemplary embodiments. In the drawing

DETAILED DESCRIPTION OF THE INVENTION

Figure 1:
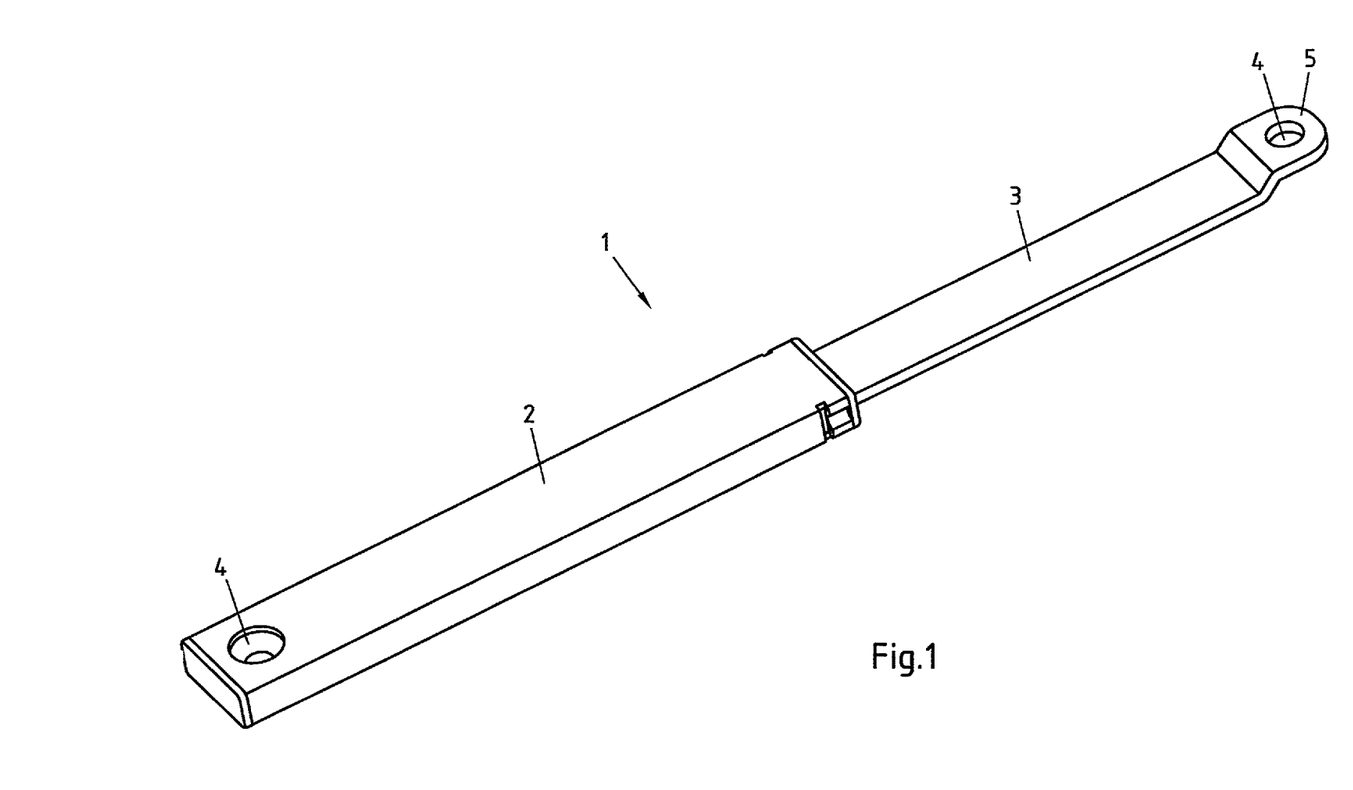
FIG. 1 shows a first lift adjuster according to the invention in a perspective view.

In FIG. 1, a lift adjuster 1 is depicted in a perspective view. The lift adjuster 1 comprises a housing 2 and an adjustment bracket 3 partially pulled out of the housing 2. At the rear end of the housing 2 and at the front end of the adjustment bracket 3, a through-opening 4 is provided in each case. With the aid of the openings 4, the lift adjuster 1 can be mounted on different components of seating and/or reclining furniture. The adjustment bracket 3 is, in this respect, preferably mounted on an adjustable component, while the housing 2 is preferably mounted on a non-adjustable component or an independently adjustable component of the furniture. In the case of a sofa, the adjustment bracket 3 can, for example be mounted on a swivelable armrest, while the housing 2 is fastened to a frame element of the sofa or to the seat frame. In the case of a bed, the head part can be connected to the adjustment bracket 3, while the housing 2 is fixed to a bed frame or bed structure.

The adjustment bracket 3 comprises an offset outer end 5 in the case of the lift adjuster 1 depicted and preferred in this respect, on which end the opening 4 is provided. The remaining part of the adjustment bracket 3 is designed substantially in a strip-shaped manner, however it could also be designed, for example in a rod-shaped manner. The housing 2 comprises a right-angled cross-section in the case of the lift adjuster depicted and preferred in this respect, however it could also comprise a square or otherwise shaped cross-section. The housing 2 is also substantially closed to protect against dirt, although this is not compulsory.

Figure 2A:
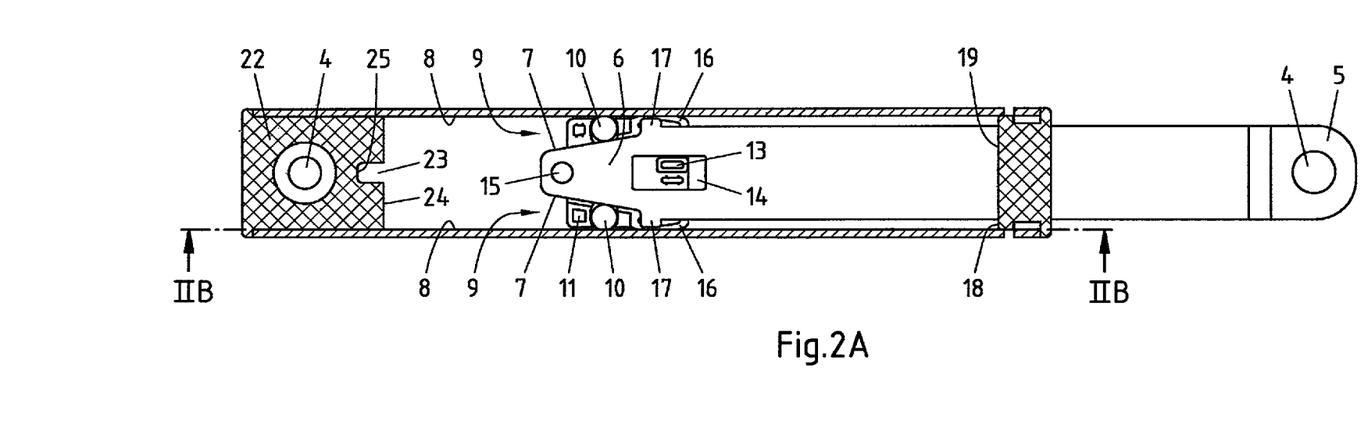
FIG. 2A-B show the lift adjuster from FIG. 1 in a partially pulled-out position in a sectional view along the sections IIA-IIA and IIB-IIB.
Figure 2B:
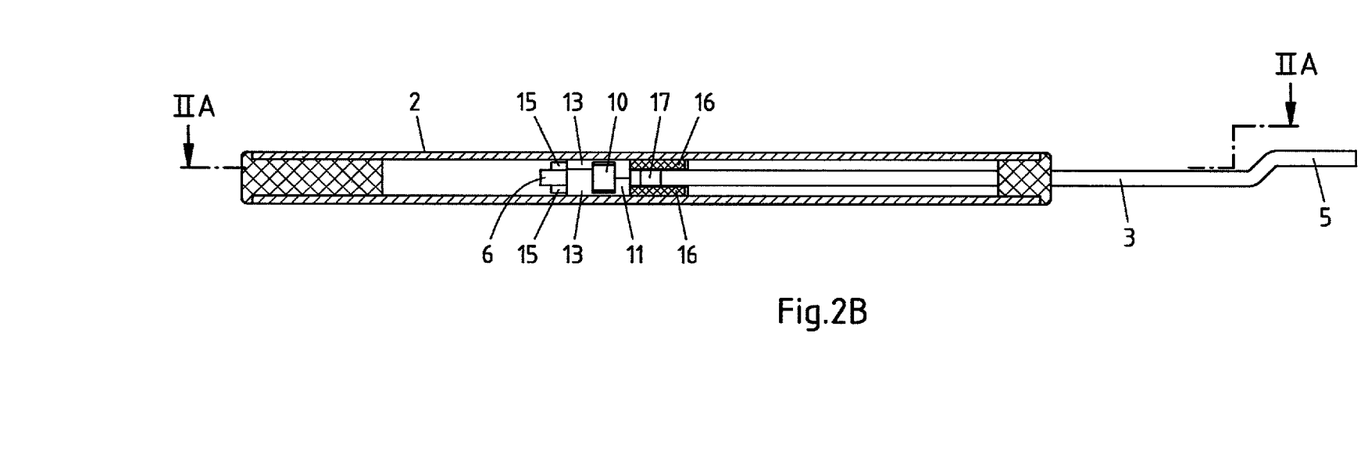

In FIGS. 2A and 2B, the lift adjuster 1 is depicted in a partially pulled-out position in two sectional views laid out perpendicular to each other. The adjustment bracket 3 recognisably comprises a tapering inner end 6. This end 6 correspondingly forms two outer surfaces 7 on the two narrow sides of the adjustment bracket 3, said outer surfaces running inclined to the opposing inner sides 8 of the housing 2. The inner sides 8 of the housing 2 run parallel to each other in the case of the lift adjuster depicted and preferred in this respect and parallel to the pull-out direction of the adjustment bracket 3. Clamping gaps 9 are correspondingly formed between the inclined running surfaces 7 of the adjustment bracket 3 and the opposing inner sides 8 of the housing 2, in which clamping gaps clamping elements 10 are received. In the case of the lift adjuster 1 depicted and preferred in this respect, the surfaces 7 forming the clamping gaps 9 are designed evenly and the clamping elements 10 have a cylindrical form. The clamping elements 10 can be clamped over the curved circumference between the adjustment bracket 3 and the housing 2.

If the adjustment bracket 3 is pressed into the housing 2 from the position depicted in FIG. 2A, the corresponding movement of the adjustment bracket 3 is prevented since the clamping elements 10 are wedged on both sides of the adjustment bracket 3 in the clamping gaps 9 provided there. The clamping elements 10 can, in this regard, receive high clamping forces such that the adjustment bracket 3 cannot be slid into the housing 2 even when high forces are applied.

The clamping elements 10 are maintained in a clamping slide 11, which is, in turn, maintained on the adjustment bracket 3. The clamping slide 11 of the lift adjuster 1 depicted and preferred in this respect is formed in two pieces and encompasses the lower end of the adjustment bracket 3. Each of the two parts of the clamping slide 11 comprises a finger 13, which engages into an oblong hole 14 of the adjustment bracket 3. The clamping slide 11 is thereby displaceably mounted with respect to the adjustment bracket 3. The degree of displaceability of the clamping slide 11 with respect to the adjustment bracket 3 is, however, limited in one direction by the clamping of the clamping elements 10 in the clamping gaps 9 and in the other direction by a positive engagement with the adjustment bracket 3, in particular the pins of the adjustment bracket.

The clamping slide 11 comprises frictional brackets 16 on two opposing sides, which rest on the inner sides 8 of the housing 2 cooperating with the clamping elements 10. The static friction caused thereby ensures that the clamping slide 11 inclines in order to maintain the position thereof. If the clamping slide 11, however, rests in a positive manner on the adjustment bracket 3, while it is slid into the housing 2 or pulled out of the housing 2, a sufficient force is exerted in order to overcome the static friction on the clamping slide 11 and the clamping slide 11 together with the adjustment bracket 3 is displaced in the housing 2. Lateral lugs 17 of the adjustment bracket 3 and the housing 2 form corresponding bearing surfaces in the pull-out direction, which, together form an end stop 18 for the adjustment bracket 3 and pulling the adjustment bracket 3 further out of the housing 2 is prevented.

Figure 3:
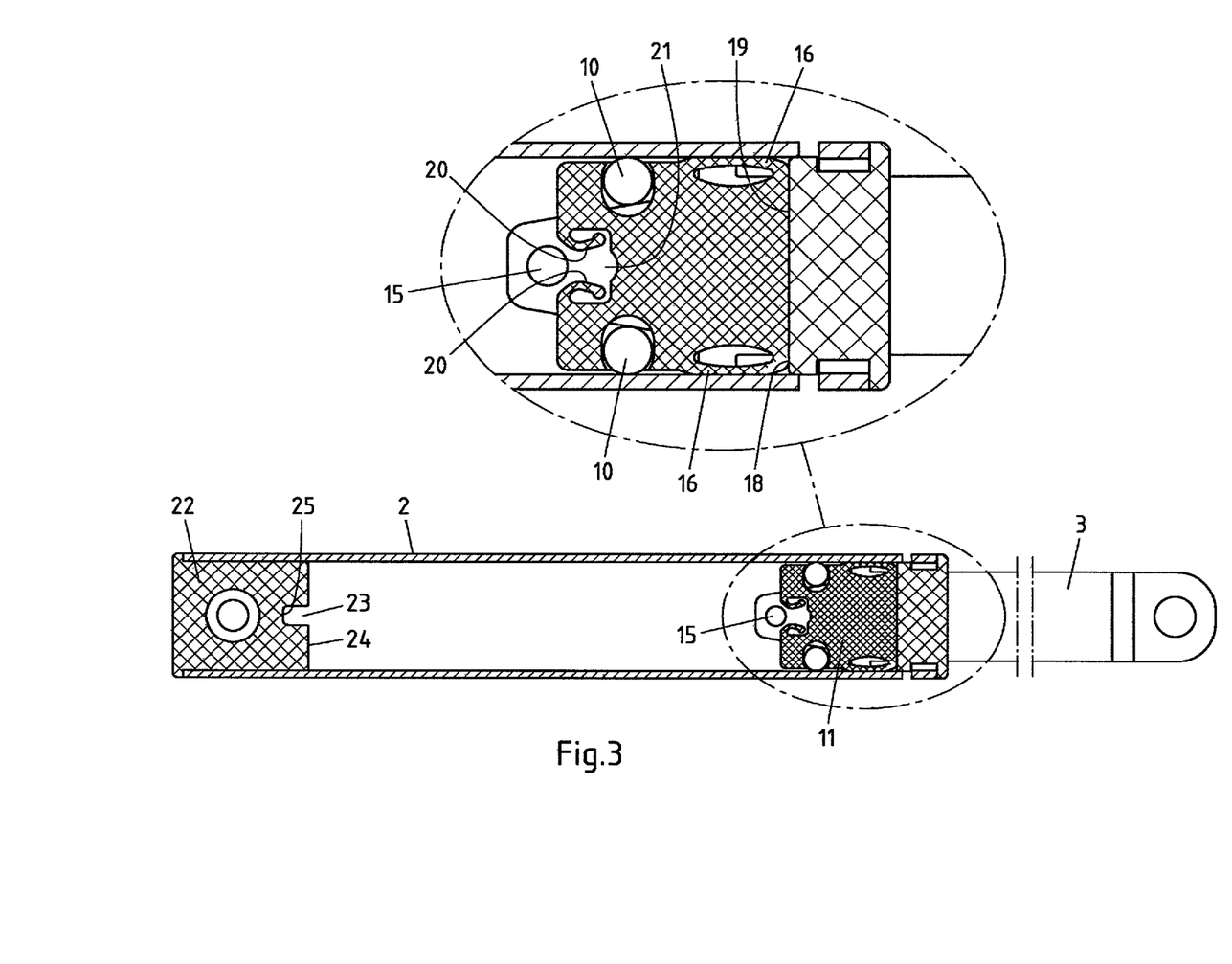
FIG. 3 shows the lift adjuster from FIG. 1 in an almost completely pulled-out position in a longitudinal section.

If the adjustment bracket 3 is pulled out further from the position depicted in FIG. 2A, the lift adjuster 1 arrives in the position depicted in FIG. 3, in which the adjustment bracket is pulled out of the housing 2 almost to an end position of the same. The clamping slide 11, which rests on the pin 15 of the adjustment bracket 3, has been displaced to an end stop 19 for the clamping slide 11 as a result. This end stop 19 limits further displacement of the clamping slide 11 in the pull-out direction of the adjustment bracket 3. If the adjustment bracket is then removed further from the housing to the end stop 18 thereof with the housing 2, the pins 15 of the adjustment bracket 3 slip past the bracket-shaped connection elements 20 of the clamping slide 11, after which the connection elements 20 engage behind the pins and thus form a separate connection between the adjustment bracket 3 and the clamping slide 11. The pins 15 are, in this respect, received in corresponding receiving cavities 21 of the clamping slide 11. This is, in particular depicted in FIG. 4. The clamping slide 11 is now in a position connected with the adjustment bracket 3, in which the clamping elements 10 cannot reach into the clamping gaps 9 in a clamping manner. The adjustment bracket 3 can thus be slid into the housing 2 without significant force input.

Figure 4:
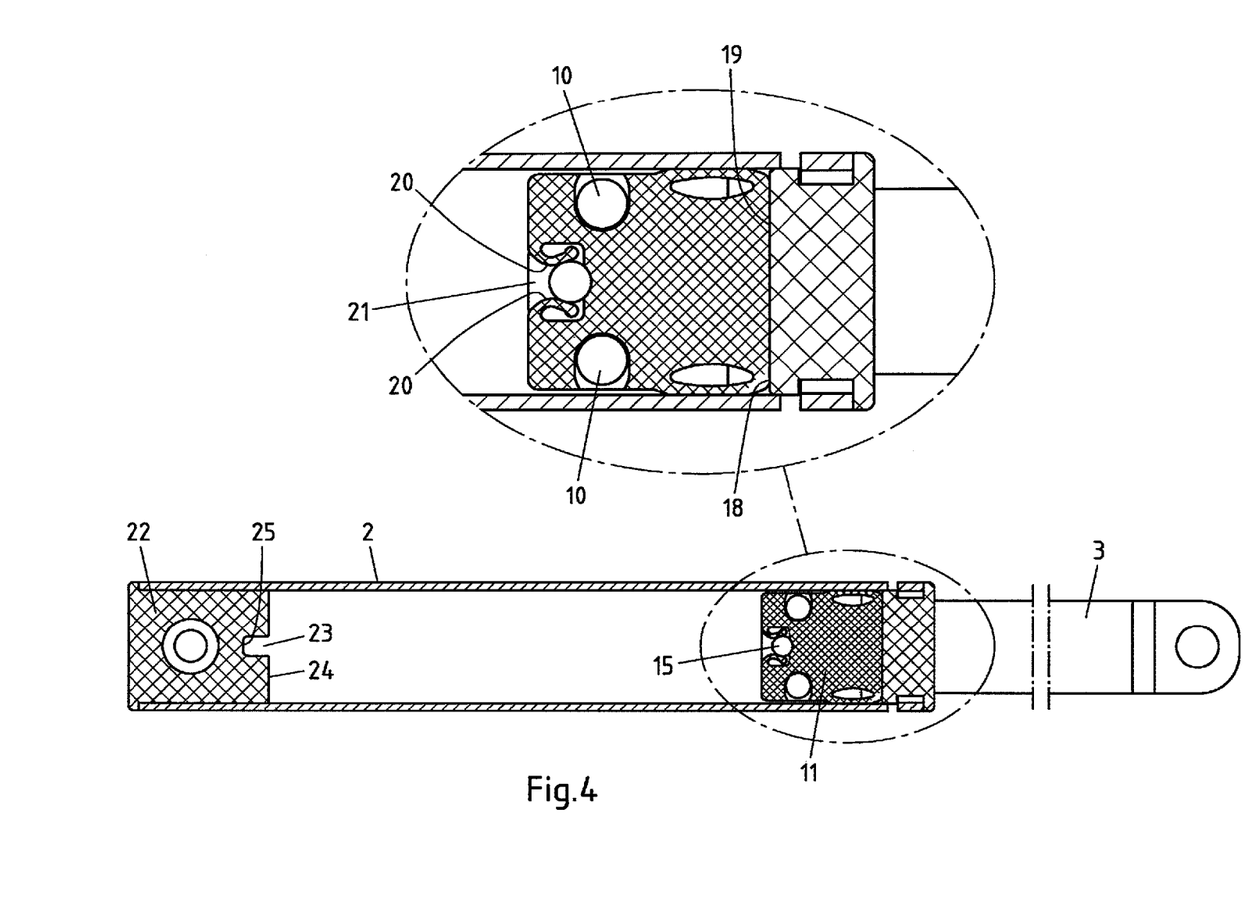
FIG. 4 shows the lift adjuster from FIG. 1 in a pulled-out end position in a longitudinal section.

In order to again release the separate connection between the clamping slide 11 and the adjustment bracket 3, the adjustment bracket 3 must be slid into the housing 2 to an initial position. This is achieved with the lift adjuster 1 depicted and preferred in this respect when the pins 15 of the adjustment bracket 3 engage into a base portion 22 of the housing 2 and abut there against the bearing surfaces of the corresponding receiving cavities 23. Before the adjustment bracket 3 reaches this initial position, the clamping slide 11, however, comes into abutment with the base of the housing 2 which thereby forms an initial stop 24 for the clamping slide 11. The clamping slide 11 is maintained in this position, while the adjustment bracket 3 can be slid in further to an initial stop 25 for the adjustment bracket 3. In this respect, the pins 15 of the adjustment bracket 3 are pressed past the connection elements 20 of the clamping slide 11 and the positive latching connection between the adjustment bracket 3 and the clamping slide 11 releases. The pins 15 of the adjustment bracket are then no longer received in the corresponding receiving cavities 21 of the clamping slide 11. The adjustment bracket 3 can thus again be partially pulled out and can, in this respect, carry the clamping slide 11 in order to, in the corresponding position, again counteract the adjustment bracket 3 once again sliding in. In order to be able to slide the adjustment bracket 3 into the housing 2 in the initial position once again, the adjustment bracket 3 has to initially be pulled out once again, as described, to the end position in order to thereby fix the clamping slide 11 via the separate latching connection to the adjustment bracket 3. The adjustment bracket 3 sliding into the housing 2 could, alternatively to the initial stop between the adjustment bracket 3 and the receiving cavity 23, also be limited by the base portion 22 and the lateral lugs 17 of the adjustment bracket 3 or by locking the clamping elements 10 in the clamping gaps 9 after releasing the separate connection between the adjustment bracket 3 and the clamping slide 11.

Figure 5:
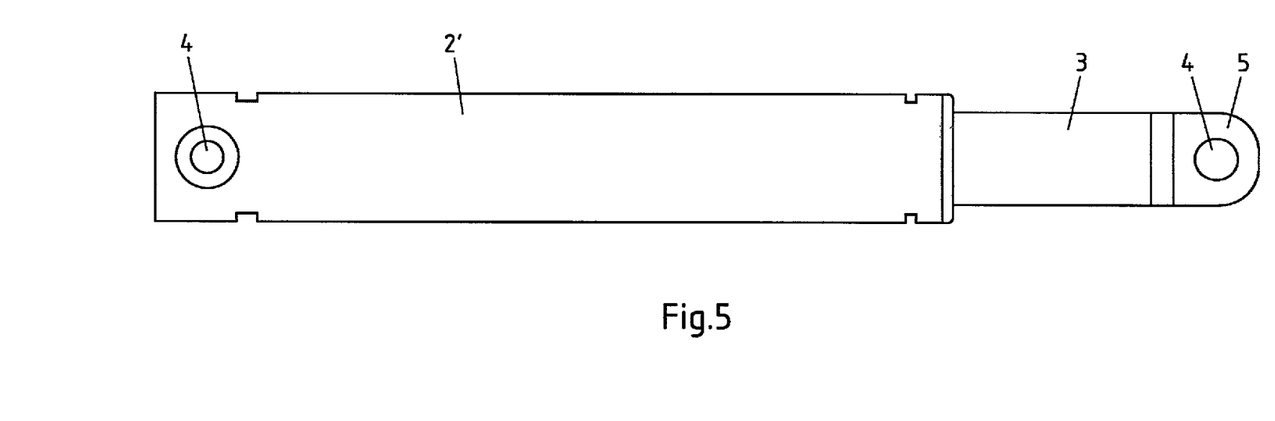
FIG. 5 shows a second lift adjuster according to the invention in a top view.

An alternative lift adjuster 1' is depicted in FIG. 5. This is distinguished from the lift adjuster 1 of FIGS. 1 to 4 only by the design of the base 26'.

Figure 6:
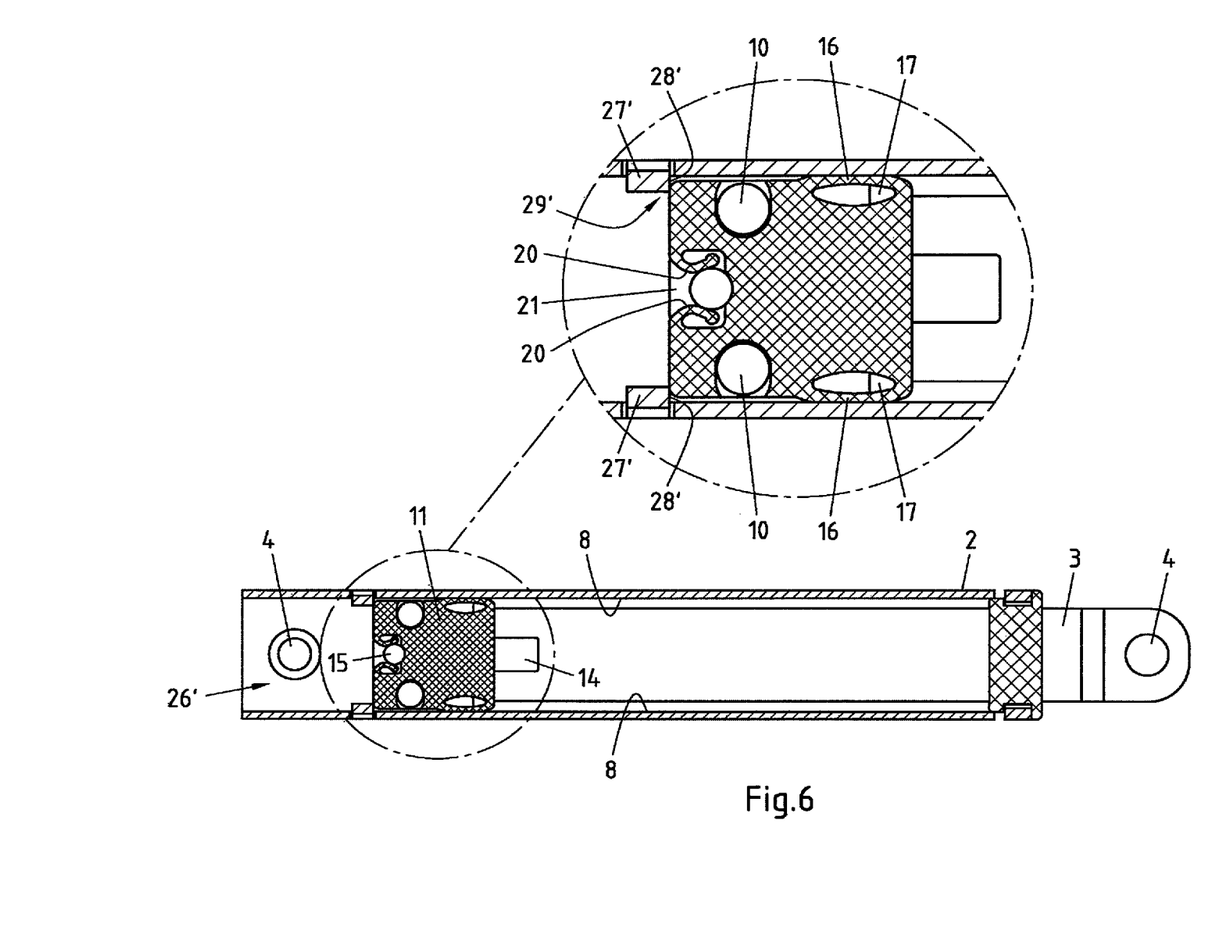
FIG. 6 shows the lift adjuster from FIG. 5 in an almost completely slid-in position in a longitudinal section and FIG. 7 shows the lift adjuster from FIG. 5 in a slid-in initial position in a longitudinal section.

The base 26' of the housing 2' of the lift adjuster 1' depicted in FIG. 5 is depicted in FIG. 6 in a longitudinal section. In the region of the base 26', two edge elements 27' of the housing 2' are pressed inwards, which provide bearing surfaces 28' pointing in the pull-out direction. The bearing surfaces 28' form an initial stop 29' for the clamping slide 11'. Instead of edge elements 27' of the housing 2' pressed inwards, the bearing surfaces 28' could also be provided by another stop element.

Figure 7:
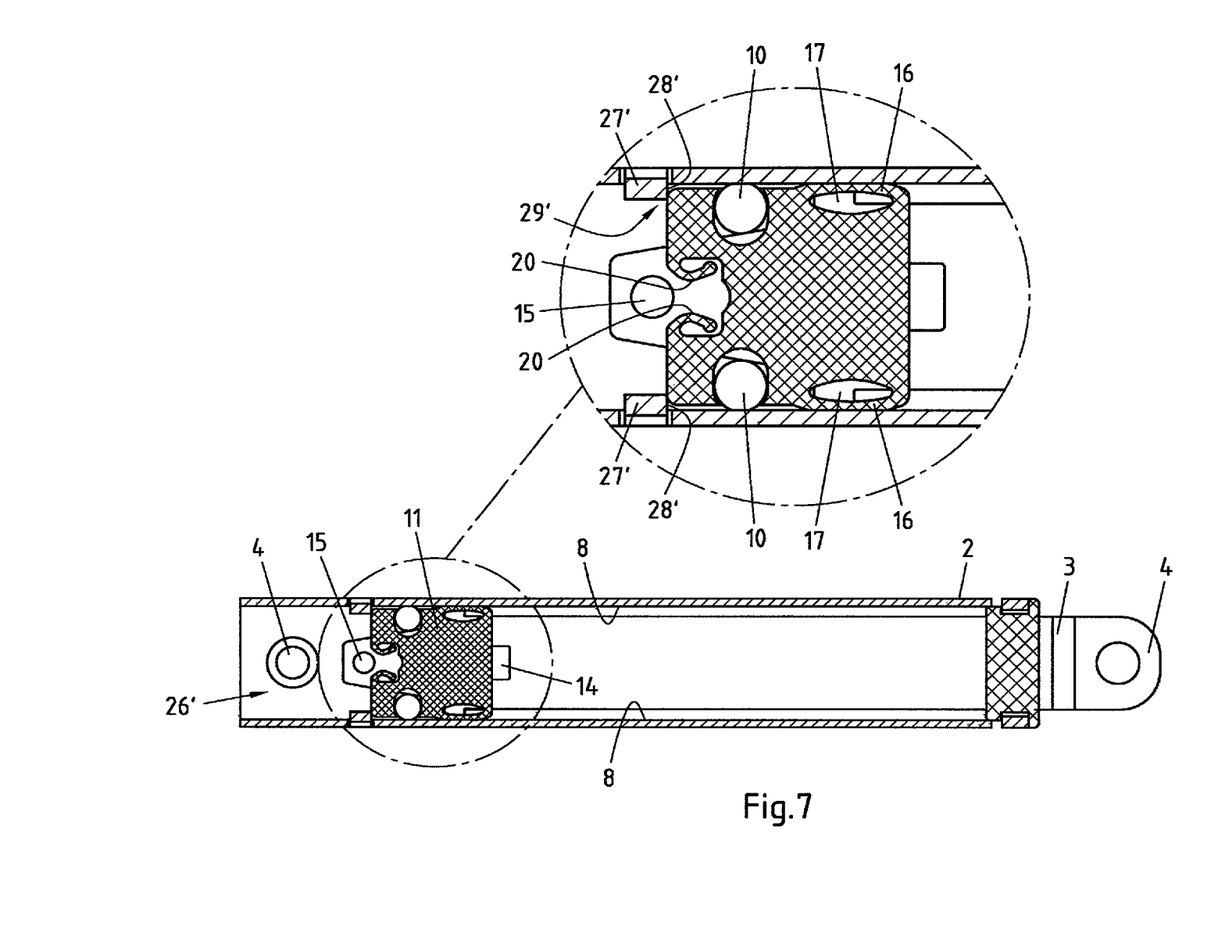

When the adjustment bracket 3 connected to the clamping slide 11 via the separate connection already described is slid into the housing 2' in the direction of the initial position thereof, the clamping slide 11 initially reaches the initial stop 29' determined by the bearing surfaces 28'. The clamping slide 11 is maintained in this position, while the adjustment bracket 3 can be slid in further. By way of the corresponding relative movement between the adjustment bracket 3 and the clamping slide 11 already resting on the initial stop 29', the pins 15 of the adjustment bracket 3 are pressed past the connection elements 20 of the clamping slide 11 out of the receiving cavity 21 of the same and in this respect the separate connection between the clamping slide 11 and the adjustment bracket 3 is released. The clamping slide 11 nevertheless continues to be maintained on the adjustment bracket 3 further displaceable with respect to the adjustment bracket 3 such that, on the one hand, the adjustment bracket 3 can be pulled out once again and, on the other hand, the clamping elements 10, in this respect, continually prevent accidental backwards sliding of the adjustment bracket 3 into the housing. The initial stop of the adjustment bracket 3 is formed by the clamping elements. After the separate connection between the clamping slide 11 and the adjustment bracket 3 is released, the clamping elements 10, with increasing further sliding of the adjustment bracket into the housing 2', reach further into the clamping gaps 9 between the housing 2' and the adjustment bracket 3 until the clamping elements 10 are clamped into the clamping gaps 9 and the adjustment bracket 3 is prevented from sliding in further.

The invention claimed is:

1. A lift adjuster for adjusting seating furniture and/or reclining furniture, comprising:
   a housing,
   an adjustment bracket, and a clamping slide slidably supported on the adjustment bracket by a first connection in an open state, wherein in the open state the clamping slide is released from fixed connection by a separate second connection to the bracket, and wherein in a closed state the clamping slide is releasably fixed to the adjustment bracket by the separate second connection,
   wherein the adjustment bracket is maintained in the housing and can be partially pulled out of the housing,
   wherein at least one clamping element is provided displaceable with respect to the adjustment bracket between a clamping position and at least one adjustment position and wherein the at least one clamping element is received in a clamping manner in the clamping position in a clamping gap between the adjustment bracket and the housing such that the adjustment bracket is prevented from sliding into the housing, and
   wherein the separate second connection is a releasable connection between the adjustment bracket and the clamping slide which is provided such that the adjustment bracket can be slid into the housing from an end position in the closed state connected via the separate second connection with the clamping slide into an initial position and in that the housing is provided an end stop for the clamping slide such that the separate second connection between the adjustment bracket and the clamping slide is forcibly moved to the closed state in the end position when the adjustment bracket is further pulled out while the clamping slide is stopped by the end stop.

2. The lift adjuster according to claim 1, wherein the clamping gap tapers in the pull-out direction of the adjustment bracket.

3. The lift adjuster according to claim 1, wherein the adjustment bracket comprises a tapering end received in the housing and in that the at least one clamping element is clamped in the clamping position between the tapering end of the adjustment bracket and the housing.

4. The lift adjuster according to claim 1, wherein the clamping slide comprising the at least one clamping element is provided and in that the clamping slide is maintained displaceable with respect to the adjustment bracket in the closed state and is received in the housing.

5. The lift adjuster according to claim 1, wherein the adjustment bracket comprises an oblong hole and in that the clamping slide engages in a positive manner and displaceably into the oblong hole.

6. The lift adjuster according to claim 1, wherein a positive engagement acting when the adjustment bracket is pulled out is provided between the at least one clamping element and the clamping slide such that the clamping slide rests on the adjustment bracket when the adjustment bracket is pulled out and the clamping side is moved with the adjustment bracket along the housing.

7. The lift adjuster according to claim 1, wherein the separate connection is a clamping connection and/or latching connection.

8. The lift adjuster according to claim 1, wherein the housing provides an initial stop for the clamping slide such that the separate connection between the adjustment bracket and the clamping slide is forcibly released when the adjustment bracket is slid into the initial position.

9. The lift adjuster according to claim 1, wherein the adjustment bracket comprises at least one pin, in that the clamping slide comprises at least one connection element and in that the connection element clamps and/or engages behind the pin when the separate connection is moved to the closed state.

10. The lift adjuster according to claim 1, wherein the housing and the adjustment bracket comprise corresponding bearing surfaces and in that the corresponding bearing surfaces are in contact in an end position of the adjustment bracket for transferring a pull-out force to the housing.

11. The lift adjuster according to claim 1, wherein the at least one clamping element and/or the clamping slide rest at least in sections in a frictionally engaged manner on the housing.

12. The lift adjuster according to claim 1, wherein the adjustment bracket is adjustable continuously along the housing.

13. A seating and/or reclining furniture comprising two components adjustable with respect to each other, wherein the two components are connected to each other via a lift adjuster according claim 1.

14. The lift adjuster according to claim 2, wherein the adjustment bracket comprises a tapering end received in the housing and in that the at least one clamping element is clamped in the clamping position between the tapering end of the adjustment bracket and the housing.

15. The lift adjuster according to claim 2, wherein the clamping slide comprising the at least one clamping element is provided and in that the clamping slide is maintained displaceable with respect to the adjustment bracket in the closed state and is received in the housing.

16. The lift adjuster according to claim 2, wherein the adjustment bracket comprises an oblong hole and in that the clamping slide engages in a positive manner and displaceably into the oblong hole.

17. The lift adjuster according to claim 2, wherein a positive engagement acting when the adjustment bracket is pulled out is provided between the at least one clamping slide such that the clamping element and/or the clamping slide rests on the adjustment bracket when the adjustment bracket is pulled out and the clamping slide is moved with the adjustment bracket along the housing.

18. The lift adjuster according to claim 2, wherein the separate connection is a clamping connection and/or latching connection.

* * * * *

UNITED STATES PATENT AND TRADEMARK OFFICE
CERTIFICATE OF CORRECTION

PATENT NO. : 9,730,519 B2
APPLICATION NO. : 15/037486
DATED : August 15, 2017
INVENTOR(S) : Erich Sartisohn It is certified that error appears in the above-identified patent and that said Letters Patent is hereby corrected as shown below:

Column 11, Line 16, Claim 6, delete "side" and insert -- slide --

Column 12, Line 11, Claim 13, after "according" insert -- to --

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*